United States Patent
Yeh

(10) Patent No.: US 11,148,743 B1
(45) Date of Patent: Oct. 19, 2021

(54) FRONT FENDER FIXING STRUCTURE FOR DIRT BIKE

(71) Applicant: YIN JING TRAFFIC INDUSTRIAL CO., LTD., Tainan (TW)

(72) Inventor: Tsan-Hao Yeh, Tainan (TW)

(73) Assignee: Yin Jing Traffic Industrial Co., Ltd., Tainan (TW)

( * ) Notice: Subject to any disclaimer, the term of this patent is extended or adjusted under 35 U.S.C. 154(b) by 0 days.

(21) Appl. No.: 16/837,302

(22) Filed: Apr. 1, 2020

(51) Int. Cl.
*B62J 15/02* (2006.01)

(52) U.S. Cl.
CPC ................. *B62J 15/02* (2013.01)

(58) Field of Classification Search
CPC ....................................................... B62J 15/02
See application file for complete search history.

(56) References Cited

U.S. PATENT DOCUMENTS

| | | | | |
|---|---|---|---|---|
| 5,186,274 A * | 2/1993 | Hegman | ................. | B62J 15/00 180/227 |
| 6,435,533 B1 * | 8/2002 | Chuang | ................. | B62J 15/00 280/152.1 |
| 6,634,664 B1 * | 10/2003 | Kojima | ................. | B62J 15/02 224/423 |
| 6,651,769 B2 * | 11/2003 | Laivins | ................. | B62J 15/00 180/229 |
| 8,016,307 B2 * | 9/2011 | Adachi | ................. | B62J 15/02 280/152.1 |
| 2007/0119643 A1 * | 5/2007 | Araujo | ................. | B62J 15/02 180/89.1 |
| 2007/0183862 A1 * | 8/2007 | Hsu | ................. | B62J 15/02 411/60.1 |
| 2013/0223924 A1 * | 8/2013 | Syu | ................. | F16B 21/125 403/321 |
| 2013/0313861 A1 * | 11/2013 | Koyama | ................. | B62J 15/00 296/198 |
| 2016/0001841 A1 * | 1/2016 | Imamura | ................. | B62J 15/02 280/152.1 |
| 2016/0288852 A1 * | 10/2016 | Nishimoto | ................. | B62J 6/04 |
| 2017/0320531 A1 * | 11/2017 | Serotta | ................. | B62J 15/02 |

* cited by examiner

*Primary Examiner* — Erez Gurari
(74) *Attorney, Agent, or Firm* — Rosenberg, Klein & Lee

(57) ABSTRACT

A front fender fixing structure for a dirt bike includes a front fender and a fixing plate. The front fender includes a connecting portion and a plurality of first locking holes. The connecting portion includes a plurality of first engaging members arranged in an array. The fixing plate includes a plurality of second engaging members arranged in an array and a plurality of second locking holes. The second engaging members correspond to the first engaging members. The first locking holes correspond to the second locking holes. The fixing plate is fixed to the connecting portion by the first locking members and the second locking members that are arranged in an array. Because the first and second engaging members are arranged in an array, when the fixing plate is placed on the connecting portion, the fixing plate can be fixed at the adjustment position without moving because of locking screws.

5 Claims, 10 Drawing Sheets

FRONT FENDER FIXING STRUCTURE FOR DIRT BIKE

FIELD OF THE INVENTION

The present invention relates to a front fender fixing structure for a dirt bike, and more particularly to a front fender fixing structure that has engaging members arranged in an array on a front fender and on a fixing plate for fixing the front fender and the fixing plate.

BACKGROUND OF THE INVENTION

When a rider rides a dirt bike on bumpy or wet roads, mud/sand/water on the ground is easy to spray. Therefore, fenders are installed on the front and rear wheels of the dirt bike. Especially, the front wheels spray mud/sand/water severely. When riding on a rainy day, without a fender on the front wheel, the sight will not be good. When the front fender is to be installed to the dirt bike, it is necessary to place a fixing plate on the front fender and then lock it. The front fender may be uneven when locked. The front fender may be displaced by the impact of stones when it is uneven, so its blocking effect is not good.

As shown in FIG. 8 through FIG. 10, a conventional front fender fixing structure includes a front fender (1a) and a fixing plate (2a). The front fender includes a connecting portion (11a) and first locking holes (12a). The connecting portion (11a) has a plurality of first engaging members (111a). The fixing plate (2a) includes a plurality of second engaging members (21a) and second locking holes (22a). The second engaging members (21a) correspond to the first engaging member (111a). The second locking holes (22a) correspond to the first locking holes (12a). The first engaging members (111a) of the connecting portion (11a) and the second engaging members (21a) of the fixing plate (2a) are respectively arranged in a zigzag configuration for the fixing plate (2a) to be engaged with the front fender (1a). When the fixing plate (2a) is placed on the front fender (1a) for the fixing plate (2a) to be locked on the front fender (1a), it is easy to be displaced to bring a clearance (d) due to the zigzag configuration. Because the gap (d) makes the engagement of the fixing plate (2a) and the front fender (1a) unstable, the front fender (1a) cannot surely block the spray of mud, sand or water. Accordingly, the inventor of the present invention has devoted himself based on his many years of practical experiences to solve these problems.

SUMMARY OF THE INVENTION

In view of the shortcomings of the prior art, the primary object of the present invention is to provide a front fender fixing structure for a dirt bike. The front fender fixing structure comprises a front fender and a fixing plate. The front fender includes a connecting portion and a plurality of first locking holes. The connecting portion includes a plurality of first engaging members arranged in an array. The fixing plate includes a plurality of second engaging members arranged in an array and a plurality of second locking holes. The second engaging members correspond to the first engaging members. The first locking holes correspond to the second locking holes.

Preferably, one of each first engaging member and each second engaging member is an engaging block, and the other of each first engaging member and each second engaging member is an engaging groove.

Preferably, the engaging block is in the form of an arcuate, conical, cylindrical or polygonal post, and the engaging groove is in the form of an arcuate, conical, cylindrical or polygonal groove.

Preferably, the fixing plate has a top and a notch located on the top. The notch is gradually reduced toward a center from two opposite sides of the fixing plate. The second locking holes include a pair of first adjustment grooves. The pair of first adjustment grooves includes a first groove and a second groove located at two opposite sides of the notch. The first groove and the second groove extend along the notch and are inclined at an angle.

Preferably, the second locking holes include a pair of second adjustment grooves. The pair of second adjustment grooves includes a third groove and a fourth groove. The third groove and the fourth groove extend along the fixing plate and are separated from the first groove and the second groove by a distance, respectively. The third groove and the fourth groove each have an L shape. The third groove and the fourth groove each have a first portion extending along the fixing plate and a second portion extending outward toward the two opposite sides of the fixing plate.

Preferably, the first engaging members and the second engaging members are arranged in a rectangular array, respectively.

Preferably, the first engaging members and the second engaging members each have an area density between 25 and 36 per square centimeter.

According to the above technical features, the following effects can be achieved.

1. The present invention comprises a front fender and a fixing plate. The front fender includes a connecting portion and a plurality of first locking holes. The connecting portion includes a plurality of first engaging members arranged in an array. The fixing plate includes a plurality of second engaging members arranged in an array and a plurality of second locking holes. The second engaging members correspond to the first engaging members. The first locking holes correspond to the second locking holes. The fixing plate is fixed to the front fender by the engaging members arranged in an array. When the fixing plate is locked by screws, the fixing plate will not be uneven due to movement.

2. The engaging block is in the form of an arcuate, conical, cylindrical or polygonal post, and the engaging groove is in the form of an arcuate, conical, cylindrical or polygonal groove. Through the engaging block to be engaged in the engaging groove, the fixing plate is fixed to the front fender, so that the fixing plate does not move when the connecting portion is adjusted.

3. The fixing plate has a notch. The second locking holes include a pair of first adjustment grooves and a pair of second adjustment grooves. The pair of first adjustment grooves includes a first groove and a second groove located at two opposite sides of the notch. The first groove and the second groove extend along the notch and are inclined at an angle. The pair of second adjustment grooves includes a third groove and a fourth groove. The third groove and the fourth groove extend along the fixing plate and are separated from the first groove and the second groove by a distance, respectively. The third groove and the fourth groove each have an L shape. The third groove and the fourth groove each have a first portion extending along the fixing plate and a second portion extending outward toward the two opposite sides of the fixing plate. The screws can be adjusted in the grooves, so that fixing plate can be locked in accordance with the positions of the locking holes of the front fender of different brands.

4. The first engaging members and the second engaging members are arranged in a rectangular array, respectively. The first engaging members and the second engaging members each have an area density between 25 and 36 per square centimeter. Through the engaging members arranged in a rectangular array, the fixing plate can be fixed on the front fender when it is adjusted.

DETAILED DESCRIPTION OF THE PREFERRED EMBODIMENTS

Embodiments of the present invention will now be described, by way of example only, with reference to the accompanying drawings.

Figure 1:
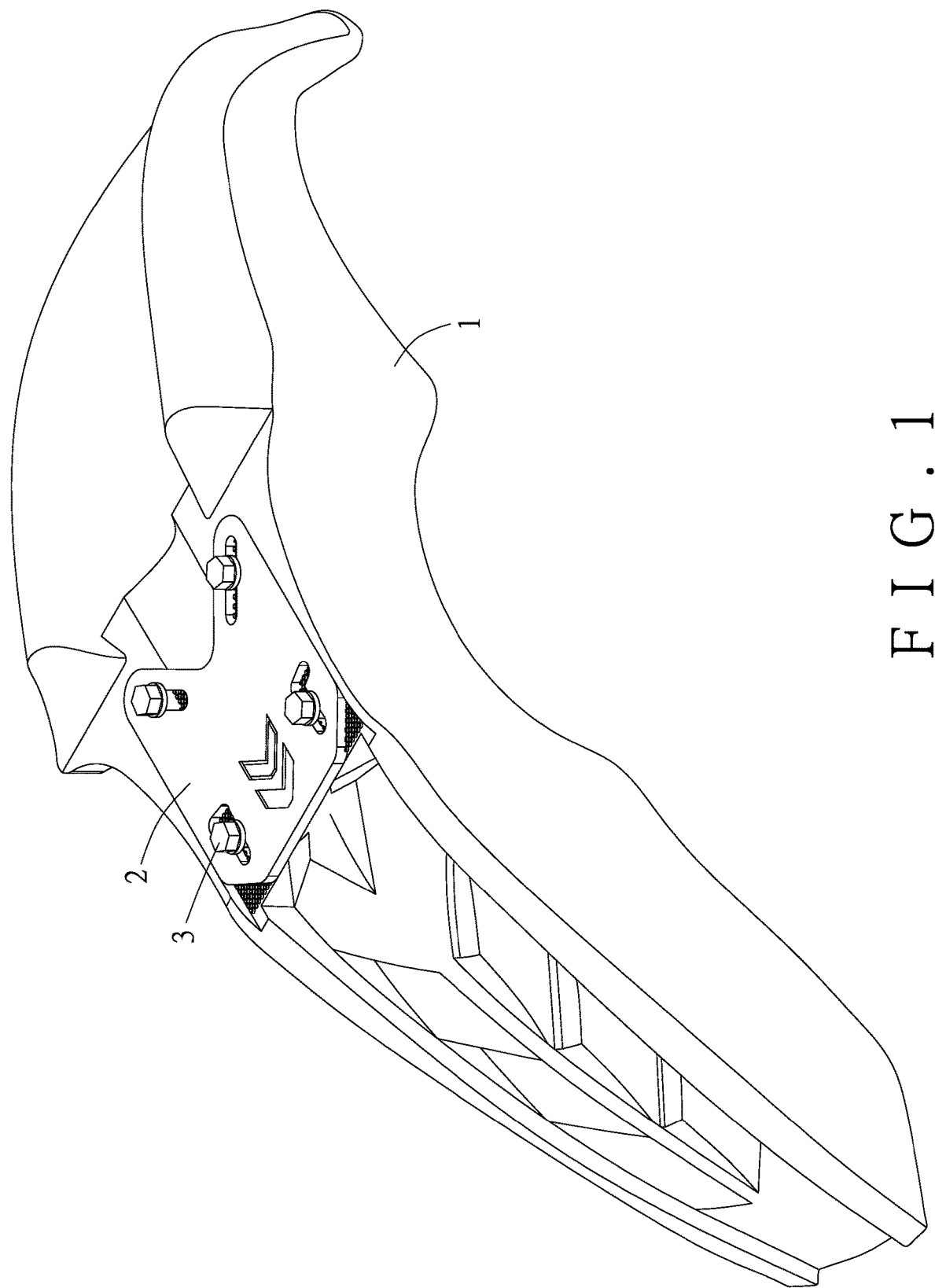
FIG. 1 is a perspective view of the front fender fixing structure for a dirt bike according to the present invention.
Figures 2, 2A, 2B:
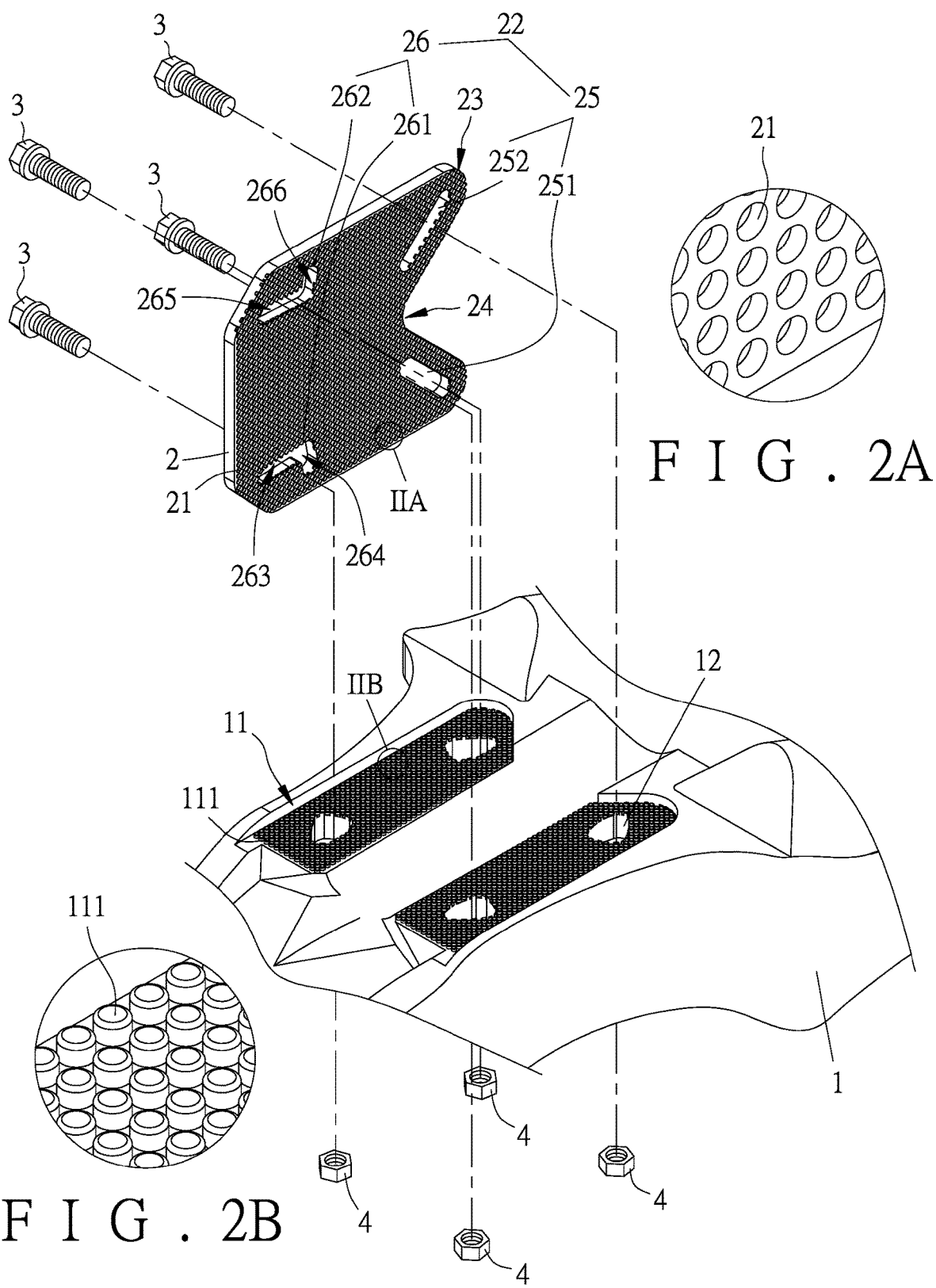
FIG. 2 is an exploded view of the front fender fixing structure according to the present invention.

As shown in FIG. 1 and FIG. 2, a front fender fixing structure for a dirt bike according to an embodiment of the present invention comprises a front fender (1), a fixing plate (2), four screws (3), and four nuts (4). The fixing plate (2) has a top (23) and a notch (24).

Figure 3:
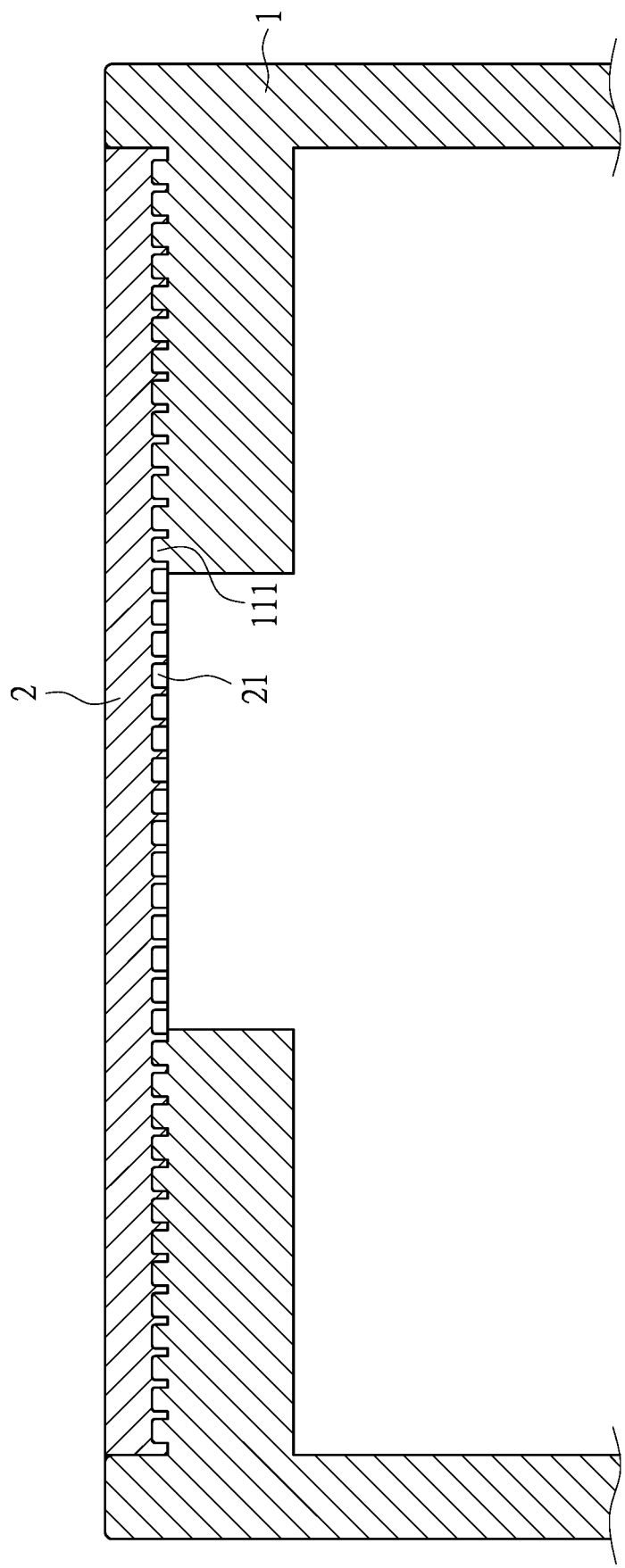
FIG. 3 is a cross-sectional view of the first engaging member in the form of a cylindrical post and the second engaging member in the form of a cylindrical groove according to the present invention.

Please refer to FIG. 2 and FIG. 3. The front fender (1) includes a connecting portion (11) and a plurality of first locking holes (12). The connecting portion (11) has a plurality of first engaging members (111) arranged in a rectangular array. The area density of the first engaging members (111) is between 25 and 36 per square centimeter. The fixing plate (1) includes a plurality of second engaging members (21) and a plurality of second locking holes (22). The second engaging members (22) are also arranged in a rectangular array. The area density of the second engaging members (21) is between 25 and 36 per square centimeter. The notch (24) is gradually reduced toward the center from two opposite sides of the fixing plate (2). The second locking holes (22) include a pair of first adjustment grooves (25) and a pair of second adjustment grooves (26). The pair of first adjustment grooves (25) includes a first groove (251) and a second groove (252) located at two opposite sides of the notch (24). The first groove (251) and the second groove (252) extend along the notch (24) and are inclined at an angle. The pair of second adjustment grooves (26) includes a third groove (261) and a fourth groove (262). The third groove (261) and the fourth groove (262) extend along the fixing plate (2) and are separated from the first groove (251) and the second groove (252) by a distance, respectively. The third groove (261) and the fourth groove (262) each have an L shape. The third groove (261) and the fourth groove (262) each have a first portion extending along the fixing plate (2) and a second portion extending outward toward the two opposite sides of the fixing plate (2). The first portion of the third groove (261) is defined as a first first portion (263), and the second portion of the third groove (261) is defined as a first second portion (264). The first portion of the fourth groove (262) is defined as a second first portion (265), and the second portion of the fourth groove (262) is defined as a second second portion (266). One of the first engaging member (111) and the second engaging member (21) is an engaging block, and the other of the first engaging member (111) and the second engaging member (21) is an engaging groove. The engaging block is in the form of an arcuate, conical, cylindrical, or polygonal post. The engaging groove is in the form of an arcuate, conical, cylindrical, or polygonal groove. In this embodiment, the first engaging member (111) is a cylindrical post, and the second engaging member (21) is a cylindrical groove.

Figure 6:
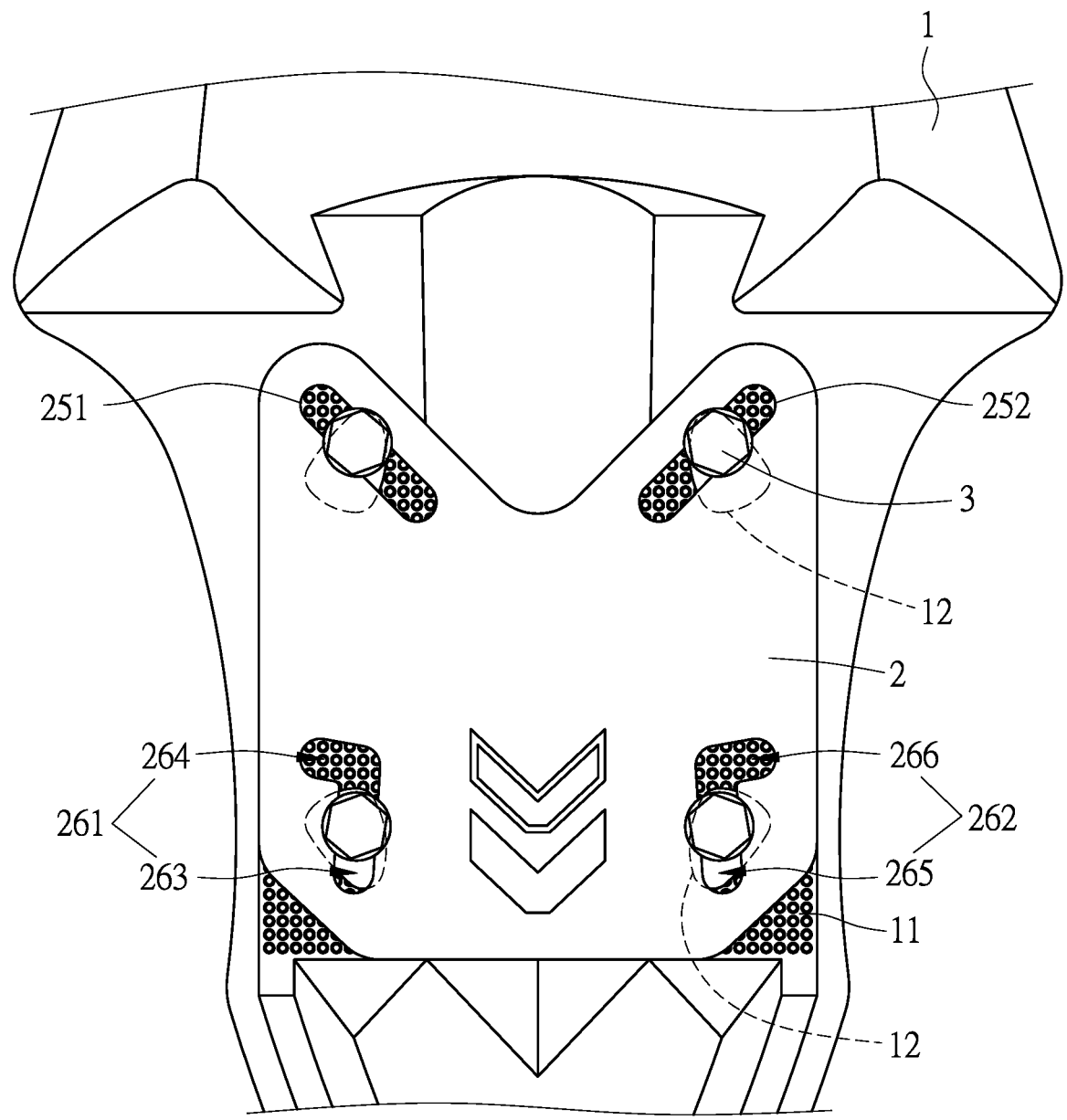
FIG. 6 is a top view of the front fender fixing structure according to the present invention.

Referring to FIG. 2 and FIG. 6, the fixing plate (2) is placed on the connecting portion (11) of the front fender (1), the second engaging members (21) correspond to the first engaging members (111), and the first locking holes (12) correspond to the second locking holes (22). The second engaging members (21) of the fixing plate (2) are engaged with the first engaging members (111) of the front fender (1), so that the fixing plate (2) is fixed to the front fender (1). After that, the four screws (3) are respectively inserted through the first groove (251), the second groove (252), the third groove (261) and the fourth groove (262) of the second locking holes (22) into the first locking holes (12) to be locked with the respective four screw nuts (4), so that the fixing plate (2) is screwedly connected to the front fender (1).

Figure 4:
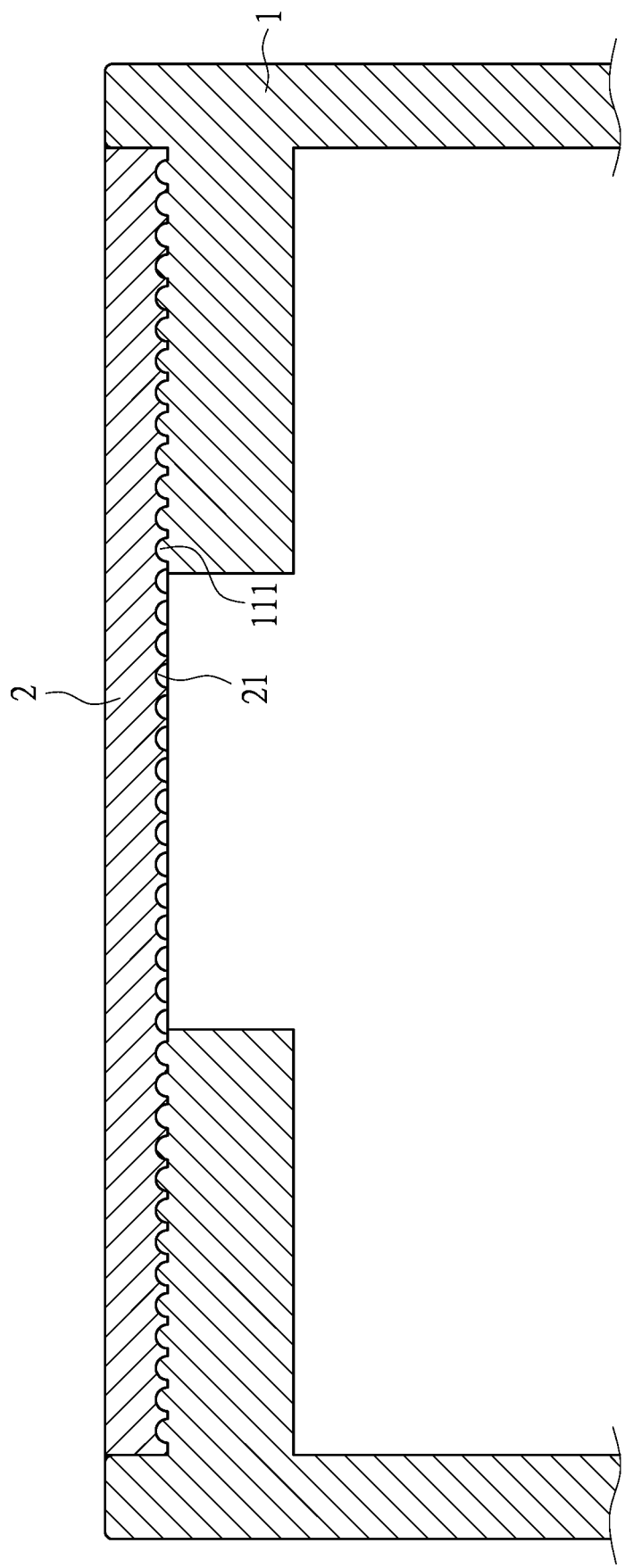
FIG. 4 is a cross-sectional view of the first engaging member in the form of an arcuate post and the second engaging member in the form of an arcuate groove according to the present invention.
Figure 5:
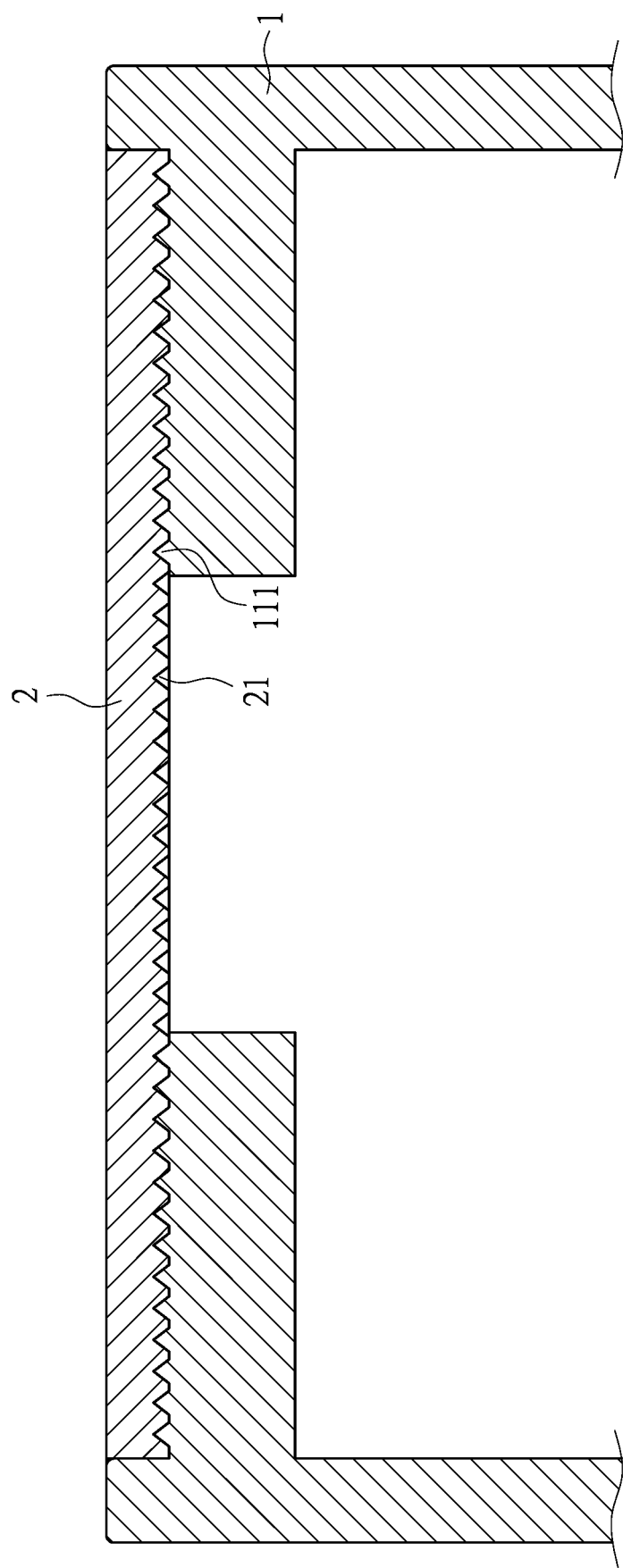
FIG. 5 is a cross-sectional view of the first engaging member in the form of a conical post and the second engaging member in the form of a conical groove according to the present invention.

As shown in FIG. 3, the first engaging member (111) is a cylindrical post, the second engaging member (21) is a cylindrical groove, and the cylindrical post is engaged in the cylindrical groove. As shown in FIG. 4, the first engaging member (111) is an arcuate post, the second engaging member (21) is an arcuate groove, and the arcuate post is engaged in the arcuate groove. As shown in FIG. 5, the first engaging member (111) is a conical post, the second engaging member (21) is a conical groove, and the conical post is engaged in the conical groove. In addition, the first engaging member (111) and the second engaging member (21) may be in a polygonal shape or other irregular shapes.

It should be particularly noted that, with the rectangular array arrangement and the above various engaging manners of the first engaging members (111) and the second engaging members (21), there is no gap (d) between the fixing plate (2) and the front fender (1). Therefore, the present invention doesn't have the shortcoming that the engagement of the fixing plate (2a) and the front fender (la) is unstable, so the front fender (la) cannot surely block the spray of mud, sand or water.

Figure 7:
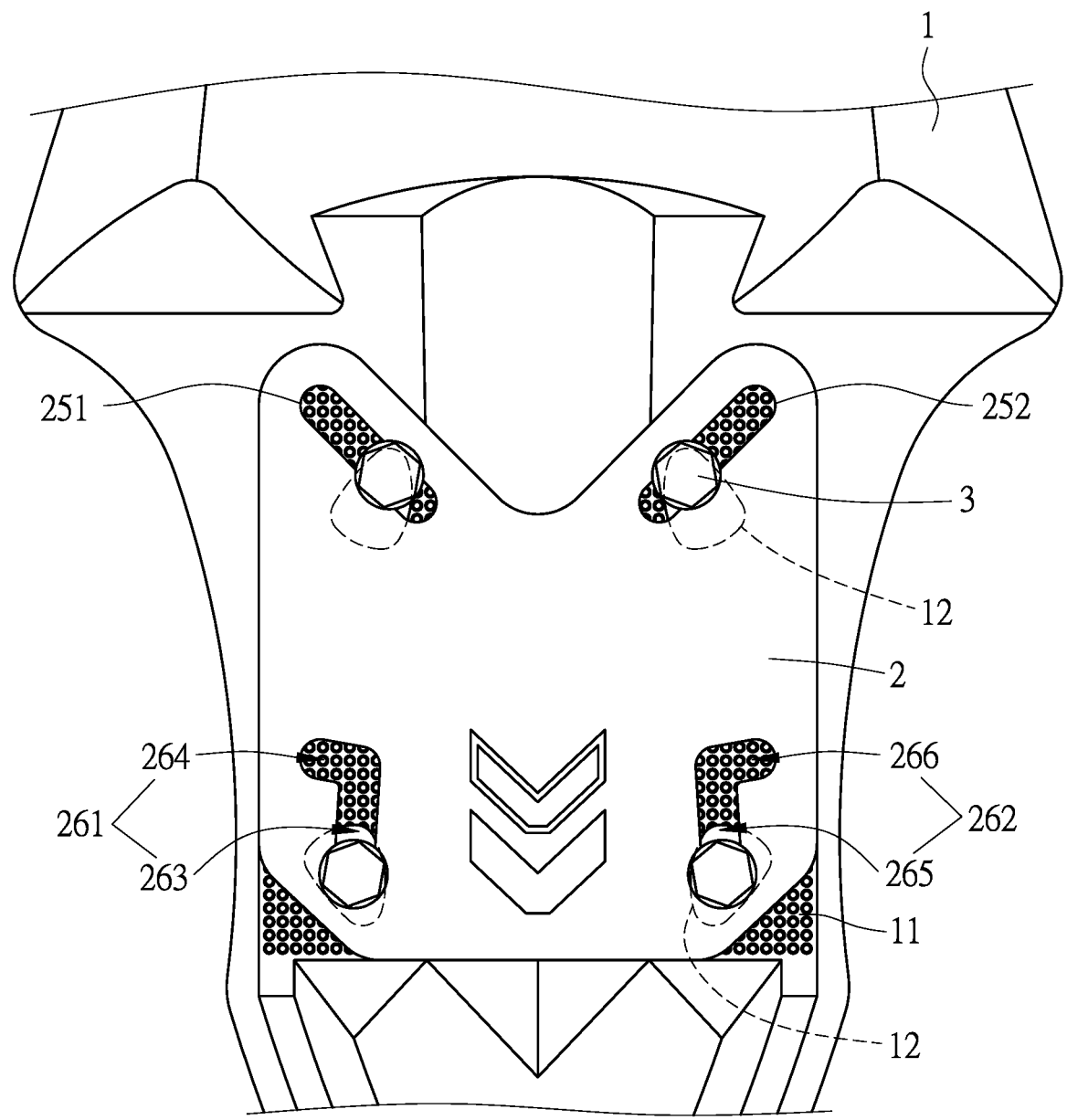
FIG. 7 is a schematic view showing the displacement of the fixing plate relative to the connecting portion of the front fender according to the present invention.
Figure 8:
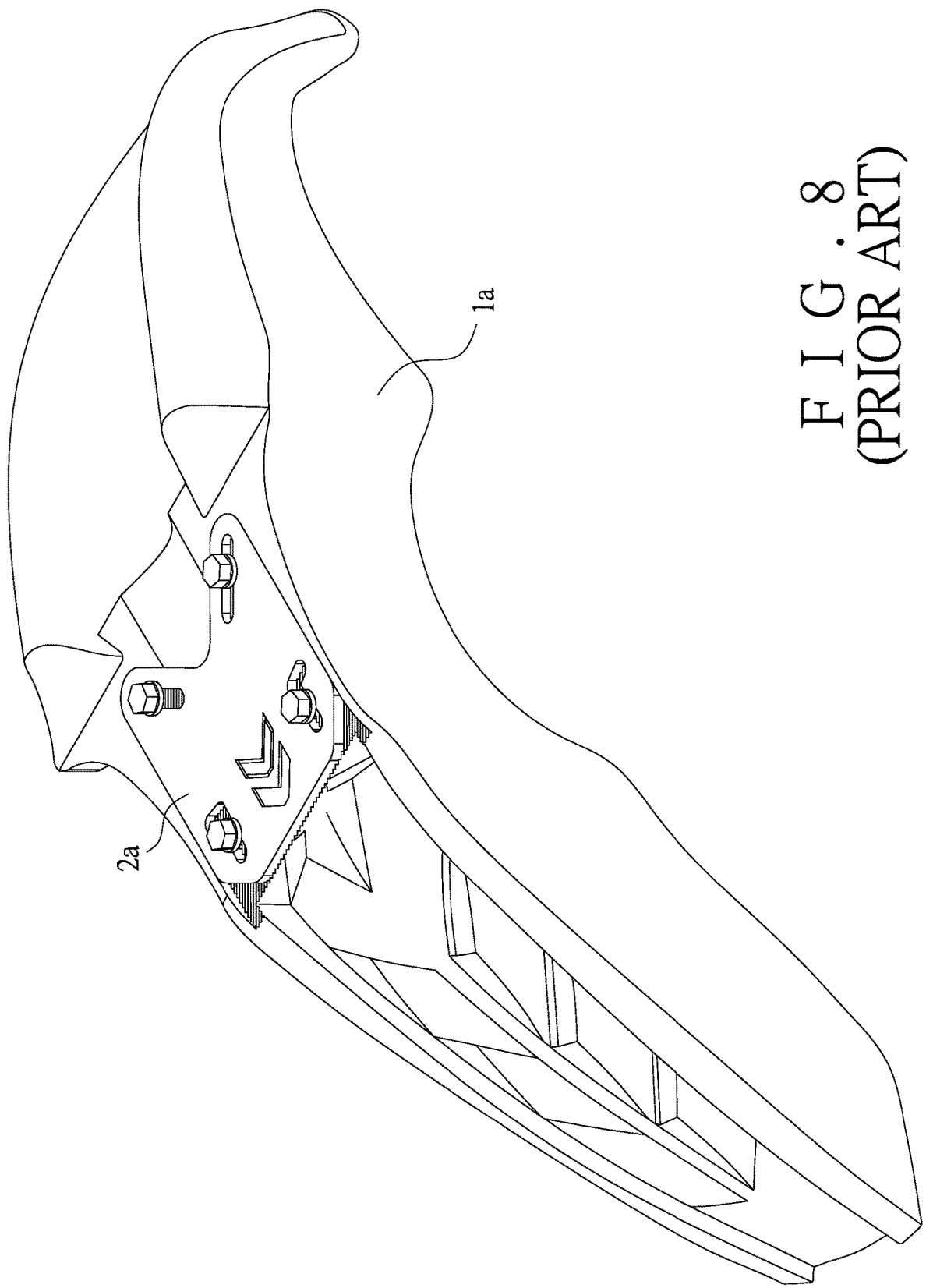
FIG. 8 is a perspective view of a conventional front fender fixing structure for a dirt bike.
Figure 9:
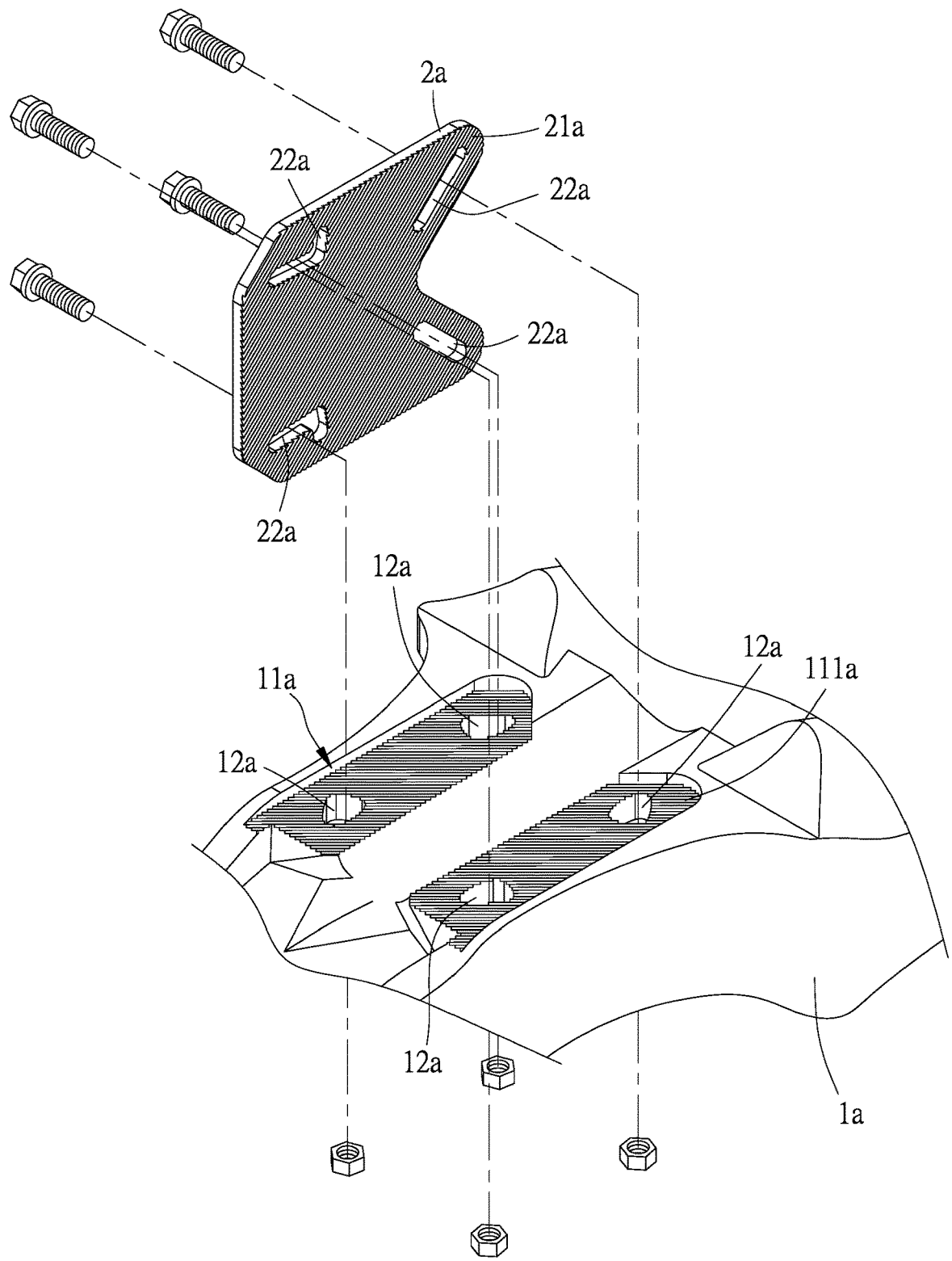
FIG. 9 is an exploded view of the conventional front fender fixing structure.
Figure 10:
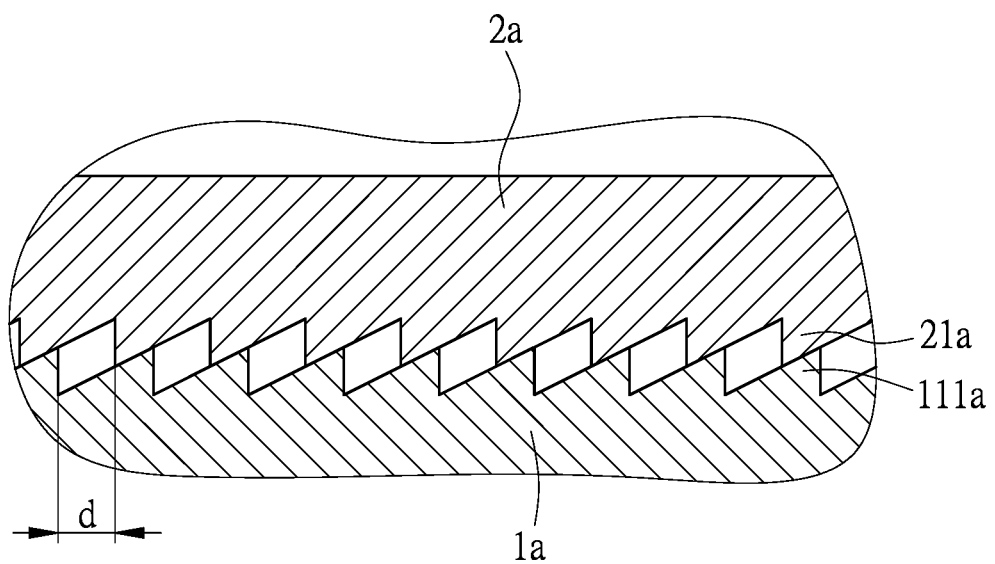
FIG. 10 is a cross-sectional view of the first engaging member and the second engaging member of the conventional front fender fixing structure.

Please refer to FIG. 6 and FIG. 7. Because the dirt bikes of different brands on the market have different shapes, the position of the first locking holes (12) of the front fender (1) may be different. In this embodiment, through the inclined first and second grooves (251, 252) on the upper portion of the fixing plate (2) and the L-shaped third and fourth grooves (261, 262) on the lower portion of the fixing plate (2), the positions of the screws (3) can be adjusted in the inclined first and second grooves (251, 252), in the first first portion (263) and the first second portion (264) of the third groove (261), and in the second first portion (265) and the second second portion (266) of the fourth groove (262), so as to be fitted in the first locking holes (12) in different positions. In this way, the fixing plate (2) in the same form can be applied to fix the front fenders (1) of dirt bikes of different brands.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A front fender fixing structure for a dirt bike, comprising:
    a front fender, including a connecting portion and a plurality of first locking holes, the connecting portion including a plurality of first engaging members arranged in an array;
    a fixing plate being disposed in juxtaposition with the connecting portion of the front fender, the fixing plate including a plurality of second engaging members arranged in an array and a plurality of second locking holes, one of the plurality of first engaging members or the plurality of second engaging member are engaging blocks and the other of the plurality of second engaging members or the plurality of second engaging members are engaging grooves, the engaging blocks corresponding to the engaging grooves, the first locking holes corresponding to the second locking holes, each engaging block is a post with one of an arcuate, conical, cylindrical or polygonal contour, and each engaging groove is a recess with one of an arcuate, conical, cylindrical or polygonal contour corresponding to the contour of the posts, the plurality of posts being configured to matingly engage corresponding ones of the plurality of recesses and thereby fix the fixing plate against planar displacement relative to the front fender.

2. The front fender fixing structure as claimed in claim 1, wherein the fixing plate has a top and a notch located on the top, the notch is gradually reduced toward a center from two opposite sides of the fixing plate, the second locking holes include a pair of first adjustment grooves, the pair of first adjustment grooves includes a first groove and a second groove located at two opposite sides of the notch, the first groove and the second groove extend along the notch and are inclined at an angle.

3. The front fender fixing structure as claimed in claim 2, wherein the second locking holes include a pair of second adjustment grooves, the pair of second adjustment grooves includes a third groove and a fourth groove, the third groove and the fourth groove extend along the fixing plate and are separated from the first groove and the second groove by a distance respectively, the third groove and the fourth groove each have an L shape, the third groove and the fourth groove each have a first portion extending along the fixing plate and a second portion extending outward toward the two opposite sides of the fixing plate.

4. The front fender fixing structure as claimed in claim 1, wherein the engaging blocks and the engaging grooves are arranged in a rectangular array, respectively.

5. The front fender fixing structure as claimed in claim 4, wherein the engaging blocks and the engaging grooves each have an area density between 25 and 36 per square centimeter.

\* \* \* \* \*